(12) United States Patent
Bono, Jr.

(10) Patent No.: US 7,735,836 B2
(45) Date of Patent: *Jun. 15, 2010

(54) CLIP GASKET TERMINATION

(75) Inventor: James J. Bono, Jr., Spring City, PA (US)

(73) Assignee: Davlyn Manufacturing Company, Inc., Spring City, PA (US)

( * ) Notice: Subject to any disclaimer, the term of this patent is extended or adjusted under 35 U.S.C. 154(b) by 906 days.

This patent is subject to a terminal disclaimer.

(21) Appl. No.: 11/530,699

(22) Filed: Sep. 11, 2006

(65) Prior Publication Data

US 2007/0018412 A1    Jan. 25, 2007

Related U.S. Application Data

(63) Continuation of application No. 10/663,000, filed on Sep. 16, 2003, now Pat. No. 7,104,546.

(60) Provisional application No. 60/415,047, filed on Oct. 1, 2002.

(51) Int. Cl.
  *F16J 15/02* (2006.01)
(52) U.S. Cl. ................... 277/630; 277/652
(58) Field of Classification Search ........... 277/609, 277/616, 626–627, 645, 652, 630–631; 24/543, 24/296, 711.3, 704.1, 704.2, 30.5 T
See application file for complete search history.

(56) References Cited

U.S. PATENT DOCUMENTS

| 767,763 | A | * | 8/1904 | Reinvaldt | 277/640 |
| 3,320,106 | A | * | 5/1967 | Kirkpatrick et al. | 156/86 |
| 4,156,533 | A | * | 5/1979 | Close et al. | 277/652 |
| 4,931,326 | A | * | 6/1990 | Weil | 428/35.8 |
| 5,205,075 | A | * | 4/1993 | Moyer | 49/493.1 |
| 7,104,546 | B2 | * | 9/2006 | Bono, Jr. | 277/640 |

* cited by examiner

*Primary Examiner*—Vishal Patel
(74) *Attorney, Agent, or Firm*—Panitch Schwarze Belisario & Nadel LLP

(57) ABSTRACT

A hollow oven gasket has a flexible tubular member with tubular wall and fasteners in the form of clips that are captured within and extend through the wall. First and second free ends of a length of the gasket material are brought together in a termination to form a closed loop gasket member. The first end of the device is at least partially collapsed to form a male end. The second opposing end is left uncollapsed to form a female end. The male end is received within the female end to form a joint held together by engagement of the clips adjoining the joint with an oven face surrounding an oven mouth or an oven door.

17 Claims, 5 Drawing Sheets

US 7,735,836 B2

CLIP GASKET TERMINATION

CROSS-REFERENCE TO RELATED APPLICATIONS

This application is a continuation of application Ser. No. 10/663,000 filed Sep. 16, 2003, now U.S. Pat. No. 7,104,546 and claims the benefit of U.S. Provisional Patent Application No. 60/415,047 filed Oct. 1, 2002 with the same title.

BACKGROUND OF THE INVENTION

There has been a desire on the part of appliance manufacturers to develop a one-piece door construction in appliances such as ranges and microwave ovens to reduce fabrication costs. Gaskets would have to be attached to such doors from an exterior side using some type of mechanical fastening.

One approach for mechanically mounting such gaskets to one-piece doors is disclosed in U.S. Pat. No. 4,822,060. A flexible, hollow cylindrical gasket with clip-type fasteners protruding along one side thereof is formed from a hollow, tubular, knitted wire core and braided, glass fiber yarn outer jacket. A single wire member is bent at several locations along its length to form a series of connected engagement portions that are inserted through both the core and jacket to form the "clips" of the gasket.

U.S. Pat. No. 5,107,623 describes another type of gasket construction with the same an elongated core and woven outer jacket but with a plurality of separate, individual fasteners spaced along the device. Each fastener has a base captured between the core and the woven outer jacket and an engagement portion extending away from the base and through the adjoining portion of the woven outer jacket. The individual fasteners are connected to one another in the device only through capture of each fastener by the core and outer jacket.

Termination of either type of gasket is currently relatively unattractive. The ends of the gasket are simply brought together and overlapped in some fashion, and fixed together with a suitable fastener such as a staple. Unless the appliance manufacturer can hide the joint thus formed in some way, for example, by covering it with part of a door panel, it will remain visible on the oven door where the exposed gasket end(s) will eventually begin to fray.

SUMMARY OF THE INVENTION

Briefly stated, the present invention is a termination of a flexible hollow gasket mounted to close a gap between an oven door and an oven face surrounding an oven mouth and facing the oven door comprising: a gasket being attached to one of the oven door and the oven face, the gasket including a tubular member having first and second opposing ends, a resiliently flexible wall formed at least substantially by intertwined fibrous yarns extending between the ends and a plurality of fasteners extending through the flexible wall and outwardly from the flexible wall and configured to be received in spaced openings in the one of the oven door and oven face receiving the gasket; the first end of the flexible wall being at least partially collapsed to form a male end and the second end of the wall being uncollapsed to form a female end such that the male end is adjustably received within the female end to form a joint engaging the first and second ends together to form a closed loop, the joint being held together by the fasteners immediately adjoining each of the first and second ends of the wall received in two of the spaced openings.

BRIEF DESCRIPTION OF THE DRAWINGS

The foregoing summary, as well as the following detailed description of preferred embodiments of the invention will be better understood when read in conjunction with the appended drawings. In the drawings.

DETAILED DESCRIPTION OF THE PREFERRED EMBODIMENTS

Figure 1:
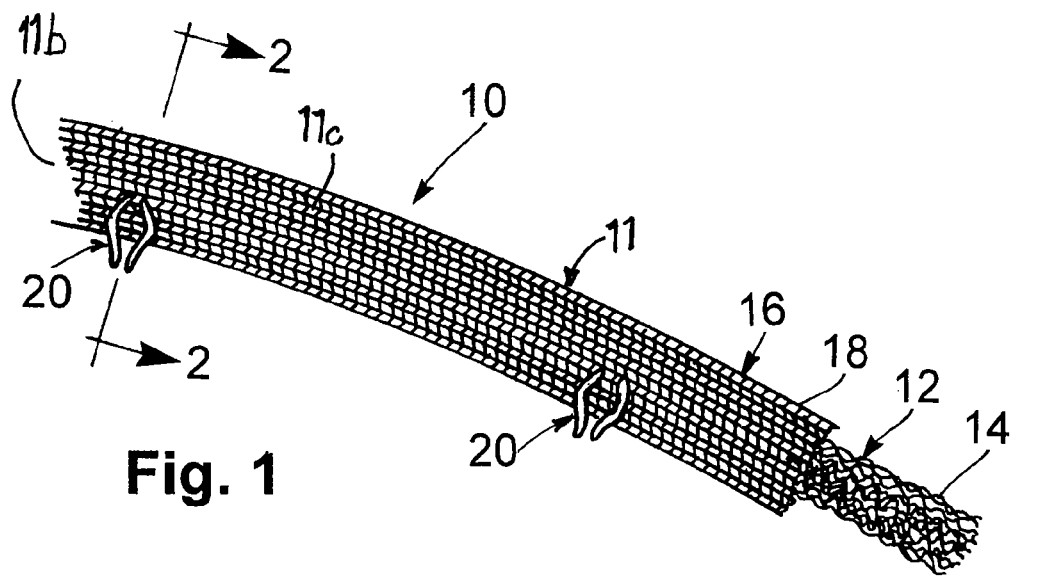
FIG. 1 is a perspective, diagrammatic, partially broken view of a preferred embodiment of a tubular gasket-type device of the invention.
Figure 2:
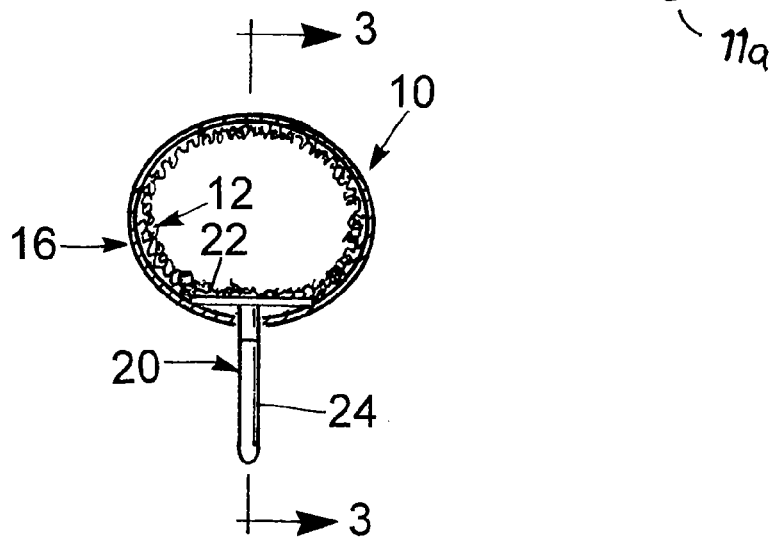
FIG. 2 is a diagrammatic, transverse, local cross sectional view of the device of FIG. 1 taken along the lines 2-2.
Figure 3:
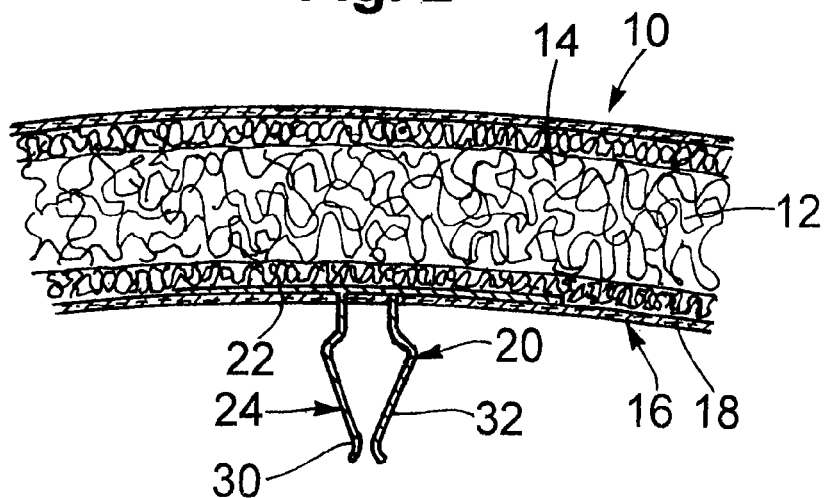
FIG. 3 is a diagrammatic, longitudinal, local cross sectional view of the device of FIGS. 1 and 2 taken along the lines 3-3 in FIG. 2.

Referring to the drawings, wherein like numerals are employed for the indication of like elements throughout, there is shown in FIGS. 1-3, a first preferred embodiment tubular gasket-type device 10 comprising a tubular member 11 having first and second opposing ends 11a, 11b and a resiliently flexible tubular wall 11c extending between ends 11a, 11b. Wall 11c is formed at least substantially by intertwined fibrous yarns 18. Referring to FIG. 1, the preferred components of the device 10 include an elongated, resilient core 12 with a woven outer jacket 16 surrounding the core 12, the two combining to constitute the tubular member 11, plus a plurality of preferably separate, individual clips 20. The core 12 is itself preferably a continuous, elongated, seamless, flexible, tubular member with closed loop, normally circular transverse cross sectional shape, formed from a plurality of intertwined, preferably knitted, stainless steel or other hardened spring wires 14 in a conventional fashion. The core 12 in FIG. 1 has been extended from one end 11b of the jacket 16 of the device 10 only for clarity. The outer jacket 16 is also a continuous, elongated, seamless, flexible tubular member of normally circular cross sectional shape that closely surrounds and extends along the core 12. Preferably the jacket 16 is formed from a multiplicity of intertwined, preferably braided, glass fiber yarns 18. Each individually spooled yarn and each individually spooled wire is also referred to as an "end" for knitting or braiding purposes. The resilient spring wire core 12 keeps the less resilient jacket 16 from collapsing under compressive load.

Figure 4:
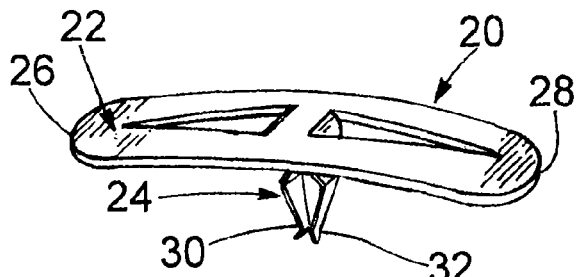
FIG. 4 is a diagrammatic, perspective view of a first fastener in the form of a punched, spring metal clip.
Figure 5:
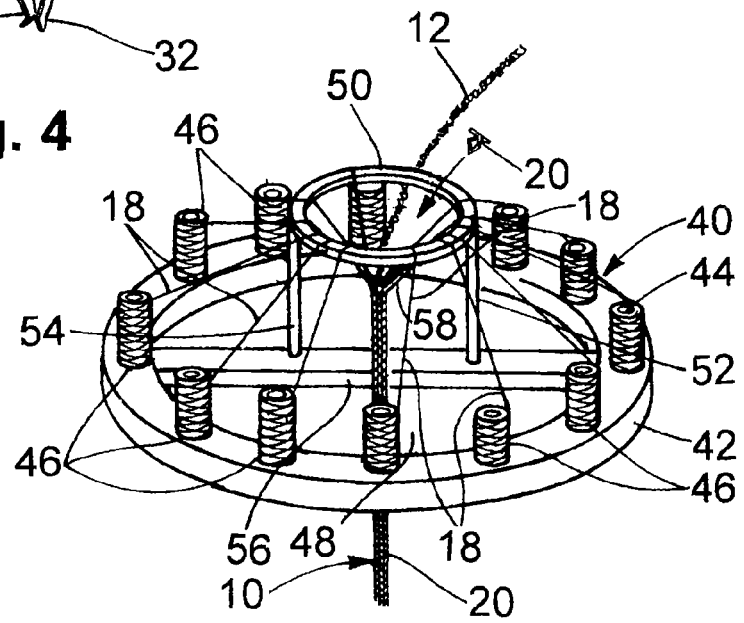
FIG. 5 is a diagrammatic view of a braiding machine configured to fabricate the devices of the subject invention in the preferred mode.

The device 10 includes a plurality of fasteners that are preferably provided by separate, individual spring material "clips" 20 and are preferably spaced at predetermined intervals along the device 10. One such clip 20 is shown separately in FIG. 4. As can be seen in that figure, the clip includes a base 22 and an engagement portion 24 integral with the base 22 and extending substantially perpendicularly from one major side thereof. The base 22 is substantially elongated between a pair of opposing ends 26 and 28 each of which is substantially rounded primarily to prevent cutting of the outer jacket 16. The engagement portion 24 of each clip 20 constitutes the fastener portion of the clip 20 and includes a pair of adjoining, resiliently flexible spring arms 30 and 32, which can be compressed against one another to enable the arms 30, 32 to pass through an opening 160 in a support member to which the device 10 is attached. Arms 30, 32 then return to their original, depicted configuration thereby securing the device 10 to the support member by an interference fit. As is best seen in FIG. 2, in this construction the base 22 of each clip 20 is captured between the core 12 and the outer jacket 16 with the engagement portion 24 extending transversely away from the base 22 and protruding outwardly through the outer jacket 16 between the yarn ends 18. In particular, the base 22 of each clip 20 is irremovably retained between portions of the core 12 and woven outer jacket 16 which adjoin one another and the base 22 by the adjoining portions of the core 12 and woven outer jacket 16. Thus, the base 22 of each clip 20 cannot be passed, for example through the core 12 into the hollow interior of the device 10 or through the outer jacket 16 without partially severing or otherwise removing or damaging at least one of the adjoining portion of the core 12 or jacket 16. The basic device 10 formed by the core 12, woven outer jacket 16 and clip-type fasteners 20 can be used as a gasket in a conventional or self-cleaning oven door.

Figure 6:
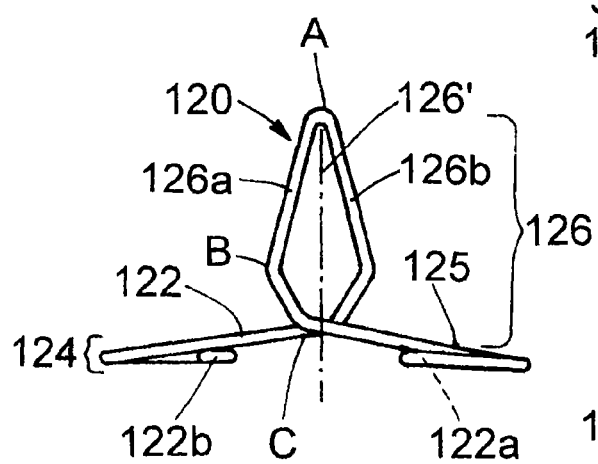
FIG. 6 is a side elevation of a presently preferred bent wire spring clip-type fastener.
Figure 7:
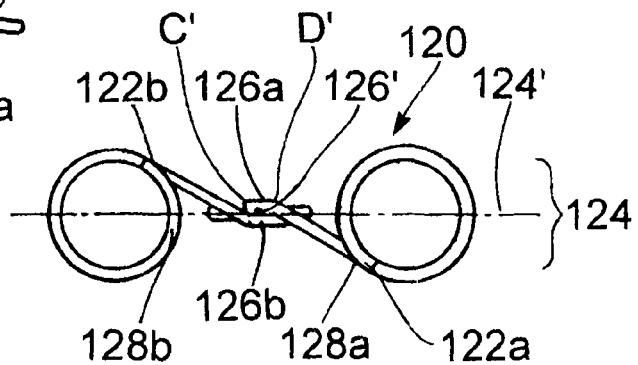
FIG. 7 is a bottom plan view of the fastener of FIG. 6.

Other types of spring metal clips with other geometries can be used. FIGS. 6 and 7 depict a separate, individual fastener in the form of a bent wire spring clip, indicated generally at 120. The fastener 120 is made from a single length of at least partially hardened wire 122. The wire 122 is bent to define a generally planar base portion or "base" 124 and a generally planar, generally diamond-shaped engagement portion or dart 126 projecting transversely from one major planar side 125 of the base 124. The dart or engagement portion 126 constitutes the fastener and is formed generally at the center of the length of wire 122 by bending the wire at three places (A, B, C) into the indicated generally diamond shape to form the pair of opposing side portions or "sides" or "arms" 126a, 126b of dart 126. The free portions of the wire 122 are bent at C' (FIG. 7) preferably to form an acute angle greater than 130° and are extended past one another, side by side, the crossing defining the end of the dart 126 proximal the base 124. The remaining free end portions of the wire 122 are bent again (at D' in FIG. 7) generally in a plane perpendicular to the dart 126 so as to partially wrap about one another and to extend away from the dart 126 in opposing directions. The base 124 is completed by curling the remaining free end portions of the wire 122 into separate loop portions 128a, 128b, which preferably are circular closed loops. It is further noted that the shape of each half of the wire 122 extending away form the medial bend "A" is identical. As a result, the first portion 128a is a reversed mirror image of the second portion 128b of the base 124 on opposing lateral sides of the central longitudinal axis 126' of dart 126 when the base 124 is viewed in plan as in FIG. 7.

Figure 8:
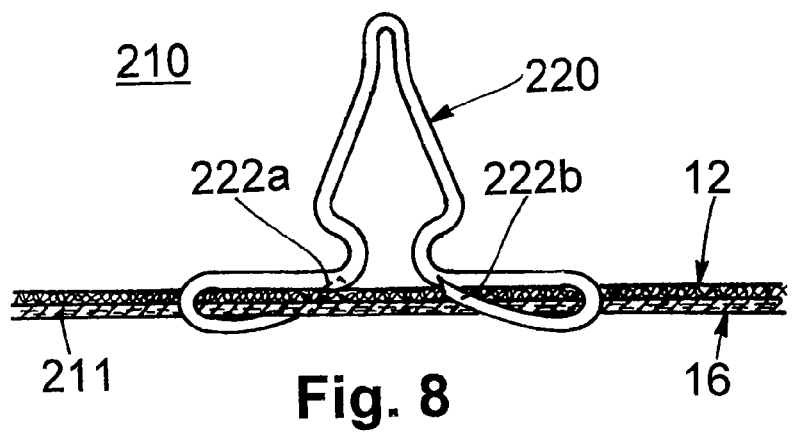
FIG. 8 is a partially broken away side elevation illustrating a second form of construction for woven inorganic tubular gaskets with spring wire members.

FIG. 8 depicts yet another form of construction in which a gasket 210 is formed with individual fasteners 220 that have a pair of free ends 222a, 222b, which are used to pierce the sidewall 211 of an elongated flexible tubular member formed from a core 12 and a woven outer jacket 16, and the ends 222a, 222b being turned back into the sidewall 211 of the tubular member to secure each separate fastener 220.

Figure 9:
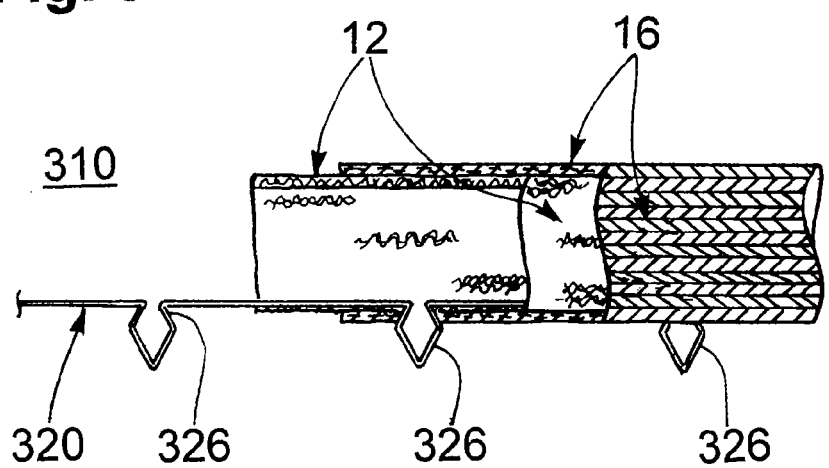
FIG. 9 is a schematic view of a third type of spring wire clip construction for use with a third form of tubular gaskets.

FIG. 9 depicts another form of construction. A gasket device 310 includes an elongated core 12 preferably of knitted spring steel wire and a surrounding outer jacket 16, preferably braided from a plurality of fiberglass yarn ends, and a continuous bent spring wire form 320 including a plurality of integrally formed engagement portions 326, which are passed through the wires or other members forming the inner core 12 and the fiberglass yarns or other members forming the woven outer jacket 16 to form a plurality of individual fasteners exposed on the device 310.

Figure 10:
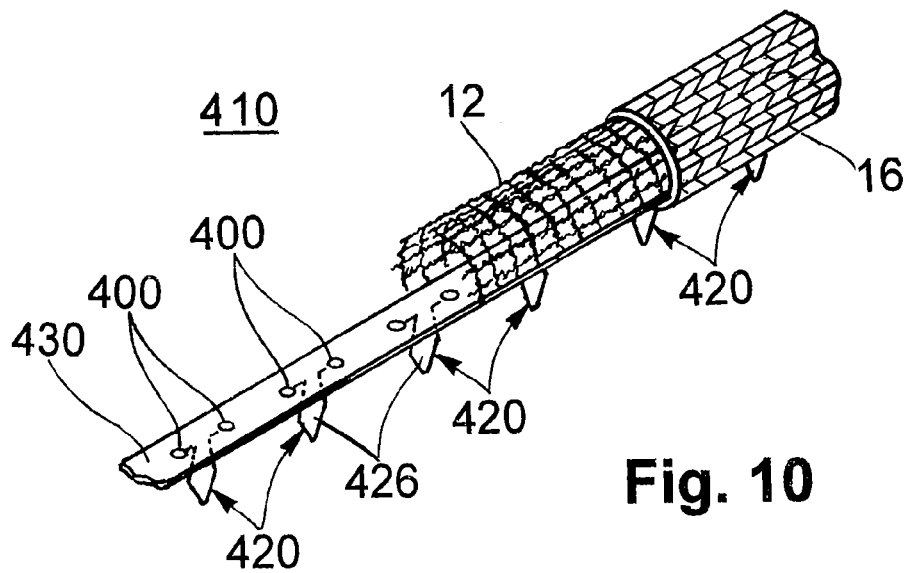
FIG. 10 is a schematic view of a fourth type of spring wire clip construction for use with a fourth form of tubular gaskets.

FIG. 10 depicts yet another form of construction. Gasket device 410 includes an inner core 12 and woven outer jacket 16 in which a plurality of individual clips 420 are first secured to a strip 430 by passing free ends of the clips 420 forming their bases through pairs of holes 400 in the strip. The strip is then inserted into the hollow tubular core 12 and jacket 16 and the engagement portions or darts 426 of the clips pushed through the interwoven ends forming the inner core 12 and outer woven jacket 16.

Figure 12:
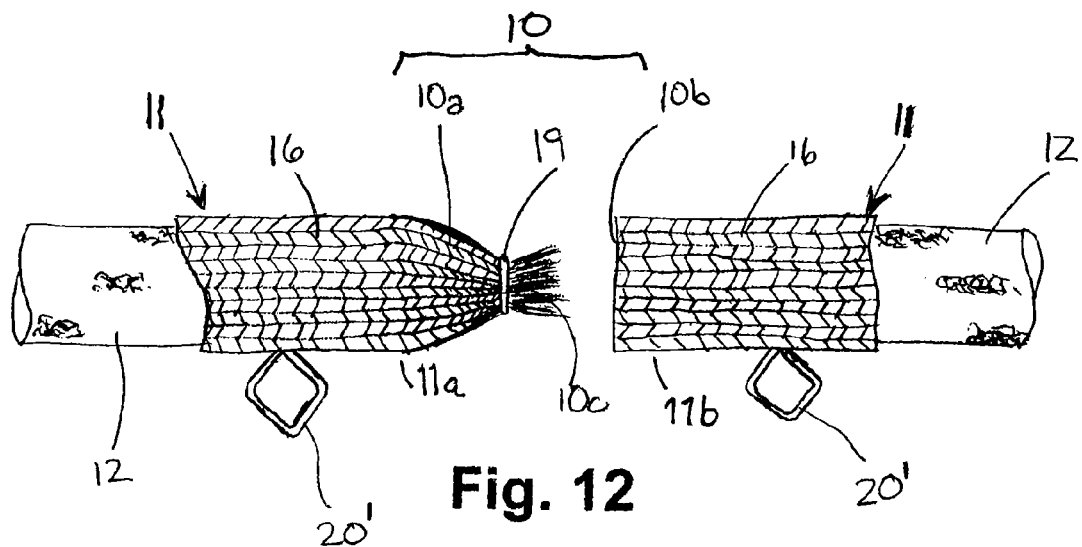
FIG. 12 depicts male and female ends of the tubular gasket of the present invention.
Figure 13:
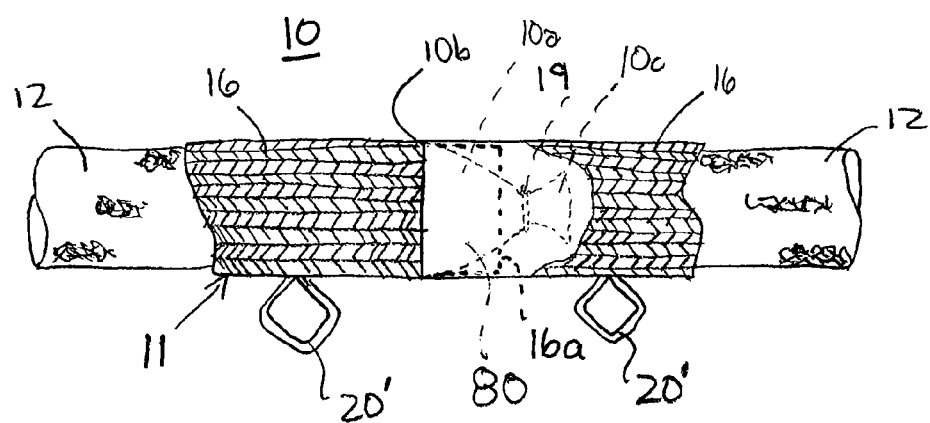
FIG. 13 depicts the male end inserted within the female end of the tubular gasket to form a joint of the present invention.

In FIGS. 12 and 13, first and second opposing free ends, a male end 10a and a female end 10b, of the device 10 (or similar free ends of devices 210, 310, 410, etc., or any other similar elongated seamless flexible tubular gasket member) are adjustably and releasably coupled together at a joint indicated in phantom generally at 80 (FIG. 13) to form a closed loop oven gasket.

Referring specifically to FIG. 12, the male end 10a is preferably formed by radially collapsing and securing the first free end 11a of gasket 10 in a radially collapsed condition by suitable means such as wrapping a wire member 19 around the device 10 at a predetermined location or otherwise clamping the end 11a down radically inwardly. The member 19 can first be passed transversely through the tubular member 11 or at least one part of the wall 11c of the tubular member 11 to secure the member 19 to the side wall 11c. Alternatively, a split ring or other ductile member can be clamped or swaged or pinched or wrapped or molded around the end 10a. The member 19 compresses the first end 11a of the device 10 into a male end 10a, which generally conical in shape up to the point of the member 19. Beyond the member 19, the device 10 is free to unravel into a frayed end 10c. Preferably, the frayed end 10c also tends to prevent the member 19 from slipping off of the device 10, but is made sufficiently short so as not to obstruct the joining of the ends 10a, 10b or otherwise interfere with the proper functioning of the device 10. Fraying will not occur inwardly beyond the wrap of member 19. It is within the scope of the present invention that the device 10 be cut from a continuous length of multilayer tubing before or after the member 19 is engaged with the device 10.

To form the female end 10b, the outer jacket 16 is preferably made longer than the core 12 at the second, opposite, free end 11b of the device 10. This can be accomplished by pulling an end of the core 12 from the end of the jacket 16 at the second end 11b of the tubular member. The core 12, if knit, will readily change shape, narrowing in diameter while extending in length, so it can be pulled out from the end of the outer jacket. A sufficient length of the end of the core 12 (for example about twelve to twenty-five mm), is cut. The new end of the core 12 is then expanded back out to its original diameter, retracting itself into the outer jacket 16. The distal end 16a of the outer jacket 16 is then preferably folded inward upon itself and tucked within the device 10 to form a funnel-like female end 10b. The female end 10b can be formed with or without the core 12 present within it. That is, the core 12 may or may not extend into the overlapped potion of the outer jacket 16. If formed without the core 12 within it, the female end 10b is more flexible and capable of more easily expanding to accommodate the male end 10a within it. However, if the female end 10b is formed with the core within it, the female end 10b will be more resilient and capable of maintaining its tubular sleeve-like shape. Of course, nothing need be done to the second end 11b of the tubular member so that end remains uncollapsed and simply open without the outer jacket being folded inwardly upon itself. Referring specifically to FIG. 13, the male end 10a is inserted into the sleeve-like female end 10b to form the joint 80. If either end of outer jacket 16 is frayed, frictional force will help to maintain the engagement of the male end 10a within the female end 10b. However, preferably clips 20' adjoining and sufficiently close to either end 10a, 10b will keep the ends together as will now be explained.

Figure 11:
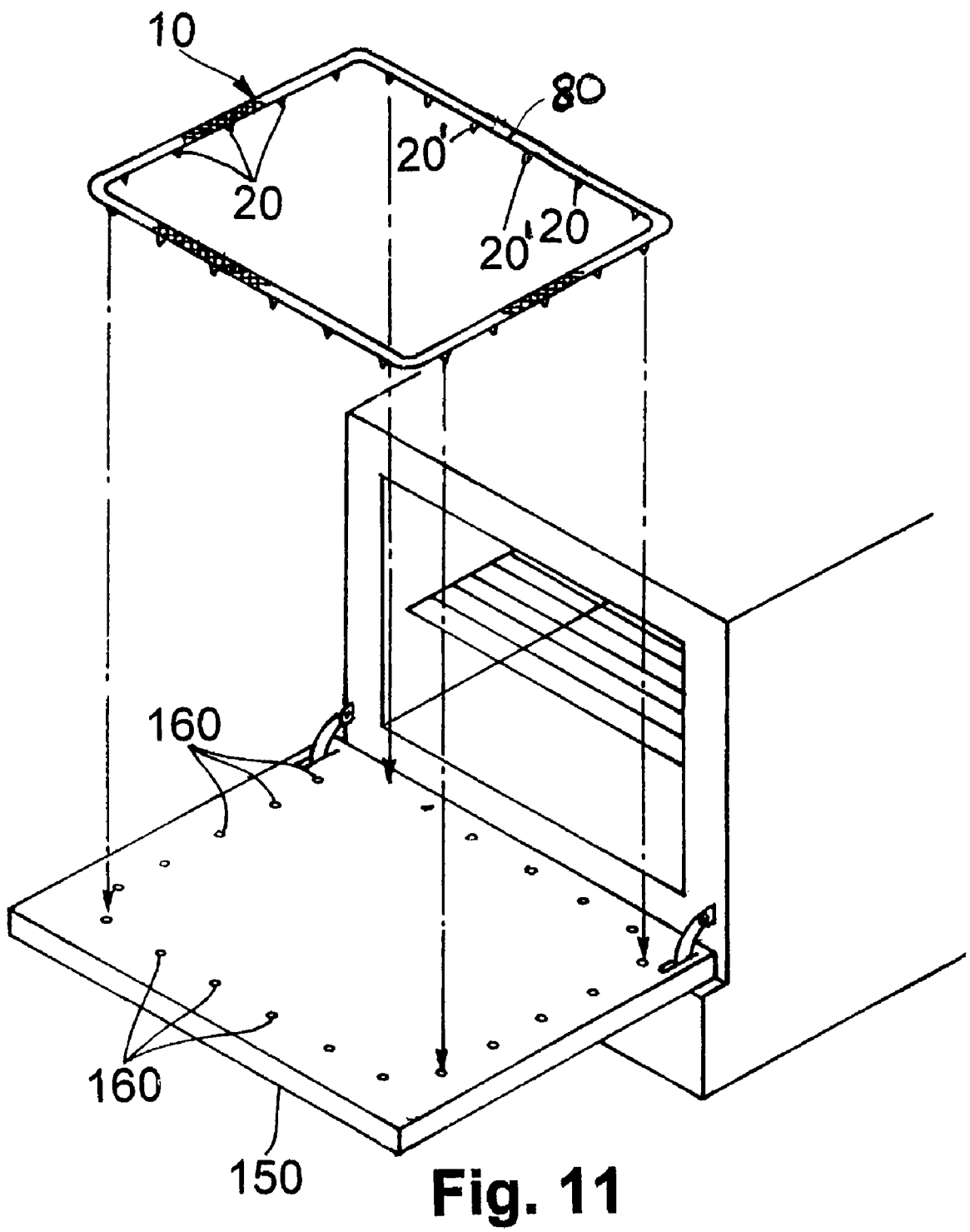
FIG. 11 depicts schematically a tubular gasket with spring wire clips and incorporating the first form of the present invention being mounted to an oven door.

Referring to FIG. 11, the device 10 is mounted in a conventional fashion to an oven door 150 (or the opposing face of the oven) with the engagement portion 26 of each clip 20, etc. mating with holes 160 or other engagement mating positions provided in the door 150 and is formed into a closed loop by inserting male end 10a into female end 10b. The use of the other disclosed devices 210, 310, 410, etc. would be the same by inserting the engagement portions of clips 20 (or 120, 220, 320, etc.) or other provided fasteners into holes 160 or other suitable receptacles. Preferably, the joint 80 is centered between the two clips 20' which adjoin the ends 10a, 10b of the device 10 and which are adjacent to each other with the joint 80 formed. (See FIG. 11) Placement of the joint 80 between two clips 20' allows for the ends 10a, 10b to be squeezed together and limits the range of motion of the joint 80 to reduce the risk that the ends 10a, 10b will become separated. Preferably each clip 20' is located sufficiently close to the adjoining end 10a, 10b (e.g. about 25 to 50 mm) to limit movement of the ends 10a, 10b when joined together and attached to the door 150. The spacing between the two end clips 20' in FIG. 11 should be no greater than and preferably less than the spacing between each end clip 20' and each nearest proximal other clip 20 and the spacing between other adjoining pairs of the other clips 20.

Devices of the subject invention can be provided in a wide variety of sizes. While at least partially hardened knitted metal wire is preferred as the core material for strength, flexibility, light weight and temperature resistance, other type of hollow and solid cores and core materials can be used. Glass fiber yarn is similarly preferred as the outer jacket material for low cost, high temperature capacity and density, which permits a substantially air tight jacket to be made. Other flexible, inorganic materials including engineered ceramic and carbon fiber material with sufficient high temperature capacity to function in ovens could be used.

Since these and other changes could be made to the above-described embodiments without departing from the broad, inventive concept thereof, the invention is not limited to the particular embodiments disclosed, but is intended to be defined by the appended claims.

I claim:

1. A termination of a flexible hollow gasket mounted to close a gap between an oven door and an oven face surrounding an oven mouth and facing the oven door comprising a gasket being attached to one of the oven door and the oven face, the gasket including a tubular member having first and second opposing ends and a resiliently flexible wall formed at least substantially by intertwined fibrous yarns extending between the ends, the gasket further including a plurality of fasteners extending through the flexible wall and outwardly from the flexible wall and configured to be received in spaced openings in the one of the oven door and oven face receiving the gasket; the first end of the flexible wall being at least partially collapsed to form a male end of the flexible wall and the second end of the wall being left uncollapsed to form a female end of the flexible wall such that the at least partially collapsed male end is adjustably received within the uncollapsed female end to form a joint engaging the first and second ends together to form a closed loop of the tubular member, the joint being held together by the fasteners immediately adjoining each of the first and second ends of the wall received in two of the spaced openings wherein the fasteners are formed from a single continuous spring wire member, the fasteners being engagement portions of the wire member protruding from the flexible wall.

2. A termination of a flexible hollow gasket mounted to close a gap between an oven door and an oven face surrounding an oven mouth and facing the oven door comprising a gasket being attached to one of the oven door and the oven face, the gasket including a tubular member having first and second opposing ends and a resiliently flexible wall formed at least substantially by intertwined fibrous yarns extending between the ends, the gasket further including a plurality of fasteners extending through the flexible wall and outwardly from the flexible wall and configured to be received in spaced openings in the one of the oven door and oven face receiving the gasket; the first end of the flexible wall being at least partially collapsed to form a male end of the flexible wall and the second end of the wall being left uncollapsed to form a female end of the flexible wall such that the at least partially collapsed male end is adjustably received within the uncollapsed female end to form a joint engaging the first and second ends together to form a closed loop of the tubular member, the joint being held together by the fasteners immediately adjoining each of the first and second ends of the wall received in two of the spaced openings;

wherein the tubular flexible wall comprises of a tubular, resilient core; and a flexible outer jacket formed by a plurality of fibrous yarns intertwined seamlessly around the resilient core; and wherein an end of the core protrudes from an end of the jacket at the first end of the flexible wall.

3. A termination of a flexible hollow gasket mounted to close a gap between an oven door and an oven face surrounding an oven mouth and facing the oven door comprising a gasket being attached to one of the oven door and the oven face, the gasket including a tubular member having first and second opposing ends and a resiliently flexible wall formed at least substantially by intertwined fibrous yarns extending between the ends, the gasket further including a plurality of fasteners extending through the flexible wall and outwardly from the flexible wall and configured to be received in spaced openings in the one of the oven door and oven face receiving the gasket; the first end of the flexible wall being at least partially collapsed to form a male end of the flexible wall and the second end of the wall being left uncollapsed to form a female end of the flexible wall such that the at least partially collapsed male end is adjustably received within the uncollapsed female end to form a joint engaging the first and second ends together to form a closed loop of the tubular member, the joint being held together by the fasteners immediately adjoining each of the first and second ends of the wall received in two of the spaced openings; and a securement mounted to the first end so as to maintain the first end in an at least partially collapsed condition even with the first end separated from the second end.

4. A termination of a flexible hollow gasket mounted to close a gap between an oven door and an oven face surrounding an oven mouth and facing the oven door comprising a gasket being attached to one of the oven door and the oven face, the gasket including a tubular member having first and second opposing ends and a resiliently flexible wall formed at least substantially by intertwined fibrous yarns extending between the ends, the gasket further including a plurality of fasteners extending through the flexible wall and outwardly from the flexible wall and configured to be received in spaced openings in the one of the oven door and oven face receiving the gasket; the first end of the flexible wall being at least partially collapsed to form a male end of the flexible wall and the second end of the wall being left uncollapsed to form a female end of the flexible wall such that the at least partially collapsed male end is adjustably received within the uncollapsed female end to form a joint engaging the first and second ends together to form a closed loop of the tubular member, the joint being held together by the fasteners immediately adjoining each of the first and second ends of the wall received in two of the spaced openings;

wherein each of the plurality of fasteners is an individual wire member having a base portion captured between the resilient core and the outer jacket and an engagement portion extending transversely away from the base portion and protruding outwardly through the outer jacket.

5. A termination of a flexible hollow gasket mounted to close a gap between an oven door and an oven face surrounding an oven mouth and facing the oven door comprising a gasket being attached to one of the oven door and the oven face, the gasket including a tubular member having first and second opposing ends and a resiliently flexible wall formed at least substantially by intertwined fibrous yarns extending between the ends, the gasket further including a plurality of fasteners extending through the flexible wall and outwardly from the flexible wall and configured to be received in spaced openings in the one of the oven door and oven face receiving the gasket; the first end of the flexible wall being at least partially collapsed to form a male end of the flexible wall and the second end of the wall being left uncollapsed to form a female end of the flexible wall such that the at least partially collapsed male end is adjustably received within the uncollapsed female end to form a joint engaging the first and second ends together to form a closed loop of the tubular member, the joint being held together by the fasteners immediately adjoining each of the first and second ends of the wall received in two of the spaced openings;

wherein the first end is secured in the collapsed position apart from being received in the second end to form the joint.

6. The gasket termination of claim 5 wherein the plurality of fasteners comprise a plurality of separate individual spring clips.

7. The gasket termination of claim 6 wherein the spring clips are individual wire members separate and distinct from each other, each spring clip being individually captured within and protruding from the flexible wall.

8. The gasket termination of claim 5 wherein the tubular flexible wall comprises of a tubular, resilient core; and a flexible outer jacket formed by a plurality of fibrous yarns intertwined seamlessly around the resilient core.

9. The gasket termination of claim 8 wherein the core is formed of at least partially hardened metal wires and wherein the flexible outer jacket is form at least substantially by inorganic fiber yarns.

10. The gasket termination of claim 9 wherein the core is formed by a plurality of knitted together, stainless steel wires.

11. The gasket termination of claim 10 wherein the outer jacket is formed by a plurality of braided together glass fiber yarns.

12. The gasket termination of claim 8 wherein the outer jacket is formed by a plurality of braided together glass fiber yarns.

13. The termination of claim 5 wherein the joint is held together by only the fasteners immediately adjoining each of the first and second ends of the wall received in two of the spaced openings.

14. A termination of a flexible hollow gasket mounted to close a gap between an oven door and an oven face surrounding an oven mouth and facing the oven door comprising a gasket being attached to one of the oven door and the oven face, the gasket including a tubular member having first and second opposing ends, a resiliently flexible wall formed at least substantially by intertwined fibrous yarns extending between the ends, the gasket further including a plurality of fasteners extending through the flexible wall and outwardly from the flexible wall and configured to be received in spaced openings in the one of the oven door and oven face receiving the gasket; the first end of the flexible wall being maintained in at least partially collapsed condition by a securement mounted to the first end to form a male end at the first end of the tubular member and the second end of the flexible wall being left uncollapsed to form a female end such that the male end is adjustably received within the female end to form a joint and a closed loop, the securement maintaining the male end at least partially collapsed in the uncollapsed female end.

15. The termination of claim 14 wherein an end of the at least partially collapsed flexible wall extends beyond the securement at the male end of the tubular member.

16. The termination of claim 14 wherein the flexible wall comprises a tubular, resilient core and a flexible outer jacket formed by a plurality of fibrous yarns intertwined seamlessly around the resilient core.

17. The termination of claim 16 wherein at least the flexible outer jacket portion of the flexible wall is partially collapsed at the first end by the securement to form the male end of the tubular member.

* * * * *